United States Patent [19]
Iida et al.

[11] Patent Number: 5,951,425
[45] Date of Patent: Sep. 14, 1999

[54] AXLE DRIVING APPARATUS

[75] Inventors: Masaru Iida; Ryota Ohashi, both of Amagasaki, Japan

[73] Assignee: Kanzaki Kokyukoki Mfg. Co., Ltd., Japan

[21] Appl. No.: 08/990,717

[22] Filed: Dec. 15, 1997

[30] Foreign Application Priority Data

Jun. 2, 1997 [JP] Japan .................................. 9-143817

[51] Int. Cl.⁶ .................................................. E01H 5/04
[52] U.S. Cl. .............................. 475/83; 60/487; 74/606 R
[58] Field of Search ........................... 74/606 R; 475/83; 60/487

[56] References Cited

U.S. PATENT DOCUMENTS

| | | |
|---|---|---|
| 4,914,907 | 4/1990 | Okada . |
| 4,932,209 | 6/1990 | Okada et al. . |
| 5,259,194 | 11/1993 | Okada . |
| 5,515,747 | 5/1996 | Okada et al. ..................... 74/606 R |
| 5,664,465 | 9/1997 | Okada et al. ..................... 74/606 R |
| 5,771,758 | 6/1998 | Hauser ................................ 74/606 R |
| 5,802,931 | 9/1998 | Louis .................................. 74/606 R |
| 5,809,845 | 9/1998 | Shimizu ............................. 74/606 R |

FOREIGN PATENT DOCUMENTS

WO 96/30277  10/1996  WIPO .

*Primary Examiner*—Dirk Wright
*Attorney, Agent, or Firm*—Sterne, Kessler, Goldstein & Fox P.L.L.C.

[57] ABSTRACT

An axle driving apparatus which houses in a housing axles and an HST for driving the axles so that a running vehicle can be driven by stepless transmission. The hydraulic pump and hydraulic motor constituting the HST are provided on a center section and are fluidly-connected with each other. The center section is formed in plate-like shape and is disposed in the housing horizontally. The hydraulic pump and the hydraulic motor are separated to one side and to another side of the axle and extend longitudinally of the apparatus, thereby making the apparatus compact and improving the weight balance thereof.

20 Claims, 16 Drawing Sheets

AXLE DRIVING APPARATUS

BACKGROUND OF THE INVENTION

1. Field of the Invention

The present invention is related to an axle driving apparatus having a housing enclosing an integrated hydrostatic transmission (HST) and a driven axle.

2. Related Art

Conventionally, an integrated hydrostatic transaxle comprises an HST (a hydraulic pump and a hydraulic motor), and axles driven by the HST which are housed within a housing. An output shaft of the hydraulic motor and the axles are operably connected for varying the rotational speed of the power generated by an engine to thereby drive the axles.

The hydraulic pump and hydraulic motor of the HST are conventionally disposed entirely forwardly or rearwardly of the axles. Such structure is disclosed in International Patent Application No. PCT/US95/04097 and in U.S. Pat. Nos. 4,914,907; 4,932,209; and 259,194.

The conventional hydraulic pump and hydraulic motor are disposed forwardly or rearwardly with respect to the axles, whereby the center section of the housing has a large width and/or length to accommodate the hydraulic pump and hydraulic motor. Furthermore, a ring gear of a differential disposed perpendicular to the axles, necessitates a longitudinally and vertically enlarged differential housing portion for enclosing therein the ring gear, thereby wasting space rendering it difficult to form a more compact apparatus.

SUMMARY OF THE INVENTION

The axle driving apparatus of the present invention includes axles and an HST for driving the axles enclosed in a housing. The HST includes a hydraulic pump and a hydraulic motor which are fluidly connected with each other. The hydraulic pump and hydraulic motor are separately disposed longitudinally of the vehicle on opposite sides of the axles. Such construction compacts the axle driving apparatus by reducing the width of the housing. The hydraulic pump and hydraulic motor are disposed laterally or to one side of a ring gear of a differential in order to reduce unused space and to make the axle driving apparatus more compact. The compact design improves the longitudinal weight distribution to the axles.

A center section having a plate-like shape is provided for supporting and interconnecting the hydraulic pump and hydraulic motor. The center section is disposed in the housing and includes a substantially horizontal planar surface. The axles extend laterally through a space formed between the hydraulic pump and the hydraulic motor. The hydraulic pump and motor are symmetrically disposed with respect to the axles to improve the longitudinal weight distribution and to simplify the structure of the center section. The axis of the hydraulic pump and the hydraulic motor are oriented perpendicular to the axles, thereby further compacting the axle driving apparatus.

A first side of the center section is disposed immediately adjacent to the axles and proximate the center of gravity of the apparatus, thereby further improving the weight distribution. Also, a transmission mechanism including a gear train is disposed on a second side of the center section opposite to the axles. The gear train operably connects an output gear of the hydraulic motor and a transmission gear of the axles. The gear train is disposed in the space under the center section, whereby the HST is disposed on the first side of the center section and the gear train is disposed on a second side thereof.

Also, the housing includes two half housings having bearing surfaces for supporting inner ends of the axles. The two half housings are joined by bolts disposed adjacent the bearings for securing the half housings together and for providing an improved rigid support for the bearings, differential and the axles.

These and other objects of the invention will become more apparent from the detailed description which follows.

DETAILED DESCRIPTION OF THE PREFERRED EMBODIMENTS

Figure 1:
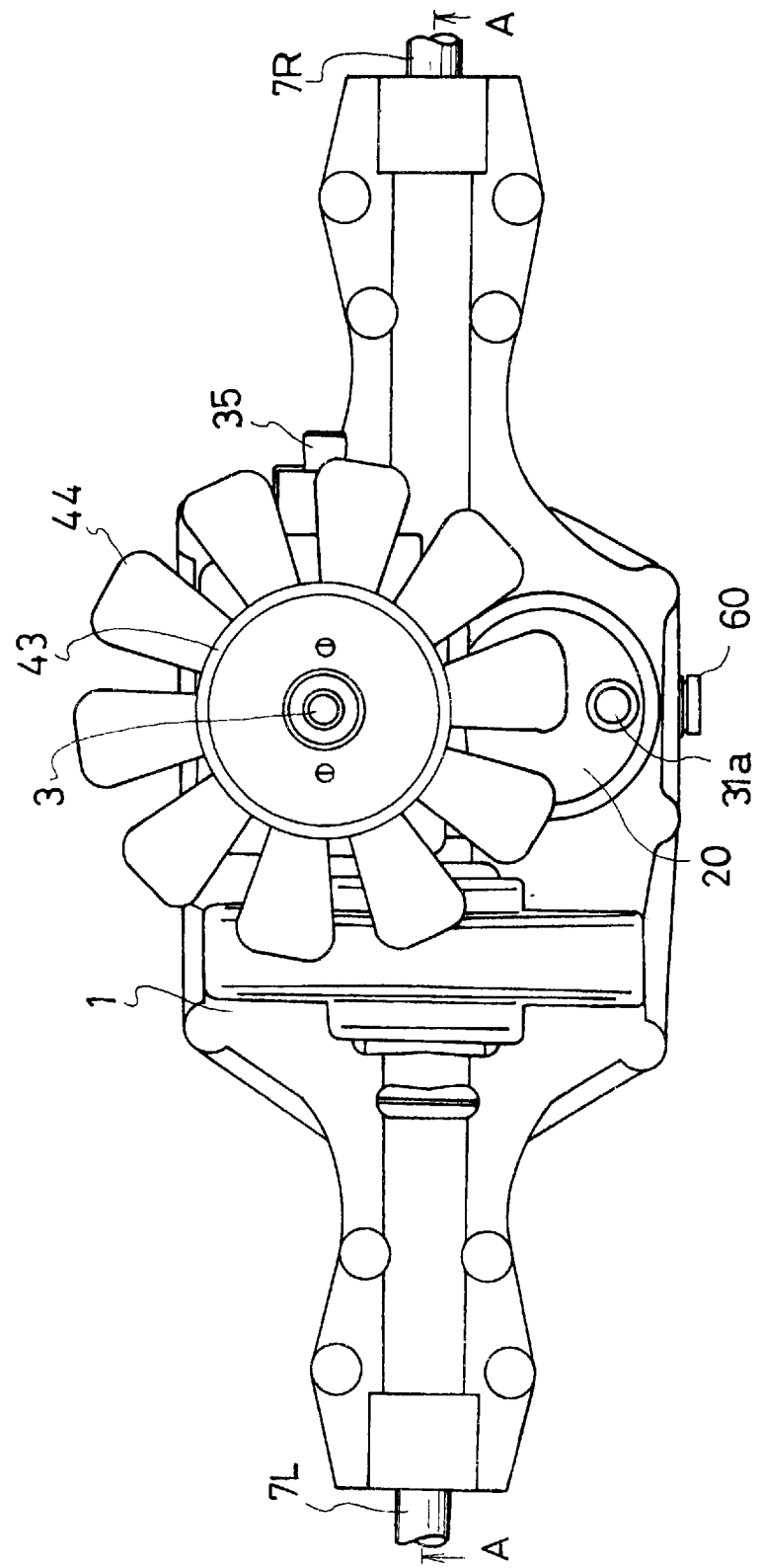
FIG. 1 is a plan view of an axle driving apparatus of the present invention.
Figure 2:
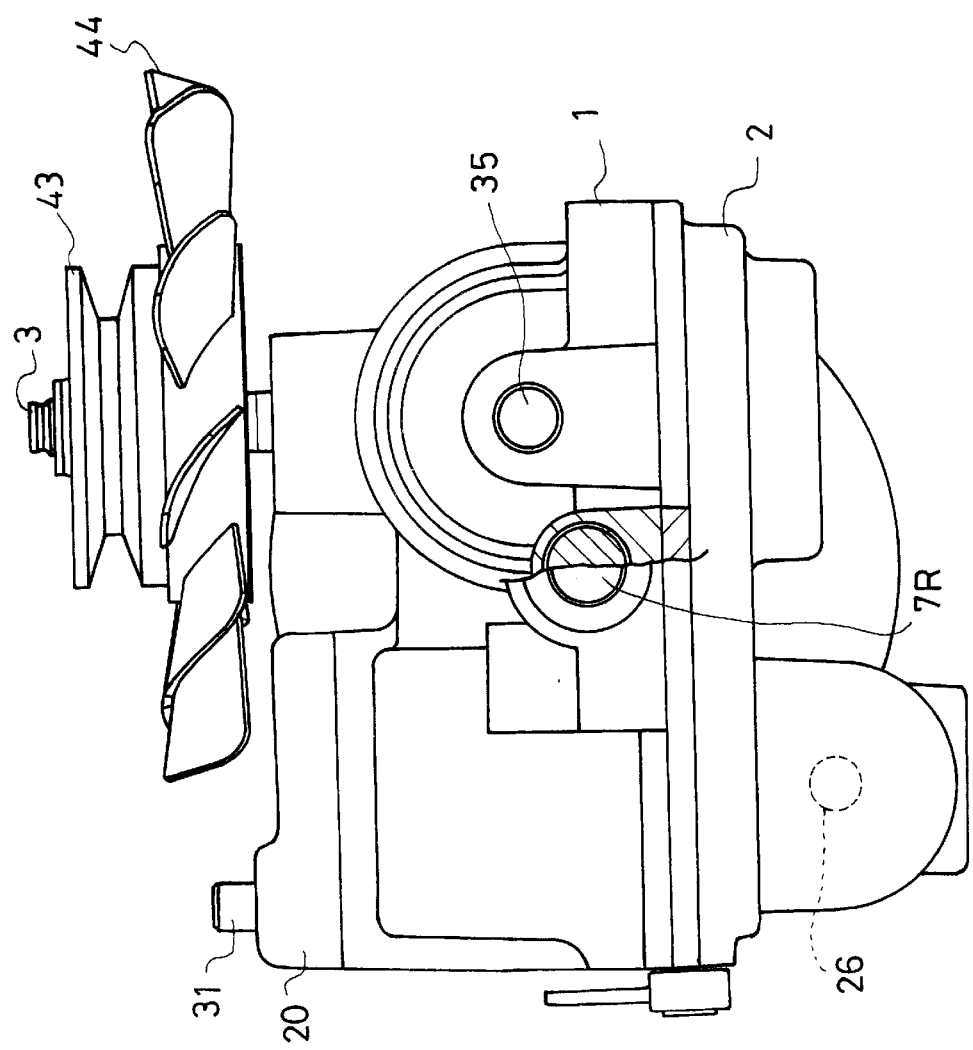
FIG. 2 is a partially sectional right side view of the present invention.
Figure 3:
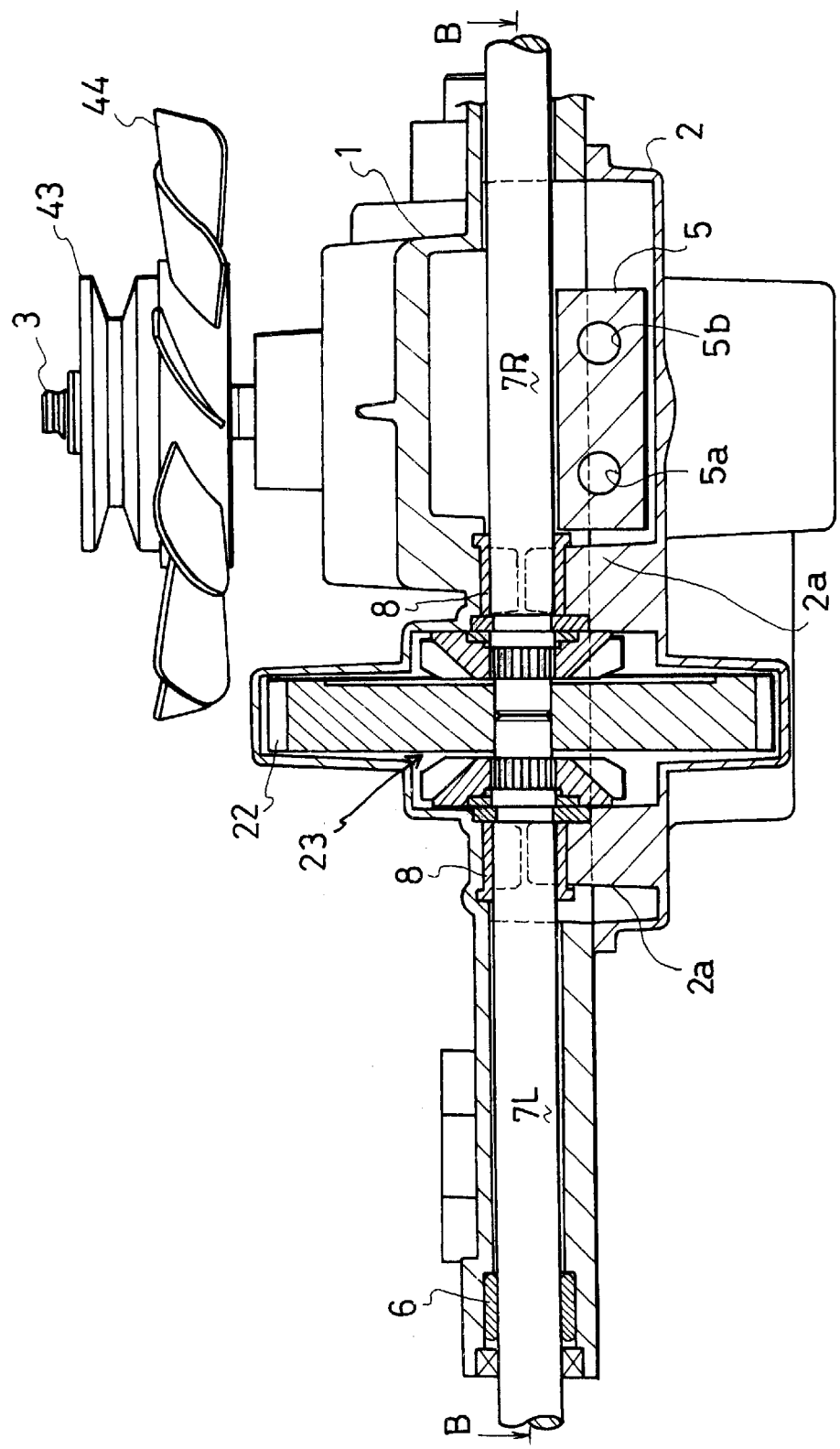
FIG. 3 is a sectional view looking in the direction of the arrows 3—3 in FIG. 1.

The axle driving apparatus will now be described with particular reference to FIGS. 1, 2, 3 and 4. A housing of the axle driving apparatus includes an upper half housing 1 and a lower half housing 2, each having peripheral flat housing joint surfaces. Axles 7L and 7R are laterally supported at the approximate longitudinal center of the housing and the approximate vertical center of the housing. Inner ends of axles 7L and 7R are supported by inner bearing bushings 8 located in bearings of half housings 1 and 2 whereby bearings 8 are disposed above the housing joint surfaces. Outer ends of axles 7L and 7R are each rotatably supported by outer bearing bushings 6 disposed at outer lateral ends of the housing. As shown in FIG. 3, inner ends of axles 7L and 7R are rotatably supported by inner bearing bushings 8 which are sandwiched between upper half housing 1 and a foot 2a of lower half housing 2. A differential 23 is offset from the transverse center of the housing and operably interconnects inner ends of axles 7L and 7R, whereby the axles extend laterally from differential 23 and outwardly from the lateral ends of the housing.

In the embodiment of FIGS. 1, 2, 3 and 4, the housing encloses a laterally offset enlarged area S. Enlarged area S houses an HST and a gear train. The gear train transmits power from a motor shaft 4 of the HST to differential 23. The housing is filled with lubricating oil, thereby providing an oil sump.

The HST comprises a hydraulic pump P and a hydraulic motor M which are longitudinally separated from each other to form a space N. The axes of axles 7L and 7R extend laterally through space N formed between hydraulic pump P and hydraulic motor M providing a compact axle driving apparatus. In this embodiment, hydraulic pump P is disposed in front of axle 7R and hydraulic motor M is disposed behind axle 7R. One skilled in the art, however, would recognize that the locations of hydraulic pump P and hydraulic motor M could be interchanged. For example, hydraulic motor M could be disposed in front of right side axle 7R and hydraulic pump P could be disposed behind right side axle 7R.

Hydraulic pump P and hydraulic motor M are disposed on a horizontal planar upper surface of a center section 5. Hydraulic pump P includes a vertically extending pump shaft 3 projecting outwardly from an upper surface of upper half housing 1. An input pulley 43 having a cooling fan 44 is provided on an upper end of pump shaft 3. The input pulley 43 receives power from a prime mover (not shown) provided on the vehicle. Hydraulic pump P generates oil pressure and thereby drives hydraulic motor M. Motor shaft 4 transmits power to differential 23 through a gear train, as discussed below. Hydraulic pump P and hydraulic motor M are arranged such that their axes of rotation are disposed vertically and perpendicularly to the longitudinal axes of axles 7L and 7R.

Referring to FIGS. 1 through 10, center section 5 is disposed beneath axle 7R with the upper surface of center section 5 immediately adjacent right side axle 7R. Center section 5 is fixed to an inner wall of upper half housing 1 by three bolts 10. The upper surface of center section 5 includes a pump mounting surface 40 and a motor mounting surface 41 formed thereon and respectively disposed forwardly and rearwardly of axle 7R. However, one skilled in the art would recognize that center section 5 may be disposed above axle 7R whereby the pump and motor mounting surfaces 40, motor mounting surface 41 are formed on a lower surface of center section 5, respectively disposed forwardly and rearwardly of axle 7R, thus providing a vertically reversed structure.

Hydraulic pump P is a variable-displacement pump of the axial piston type. A cylinder block 16 having a plurality of bores is rotatably and slidably disposed upon pump mounting surface 40. Pistons 12 with cooperating biasing springs are reciprocally inserted into the plurality of cylinder bores of cylinder block 16. A thrust bearing 11a of a movable swash plate 11 abuts against the heads of pistons 12. Pump shaft 3 extends through opening 11b of swash plate 11 and serves as the input shaft for hydraulic pump P. Pump shaft 3 is coaxial with and rotatably affixed to cylinder block 16.

Figure 8:
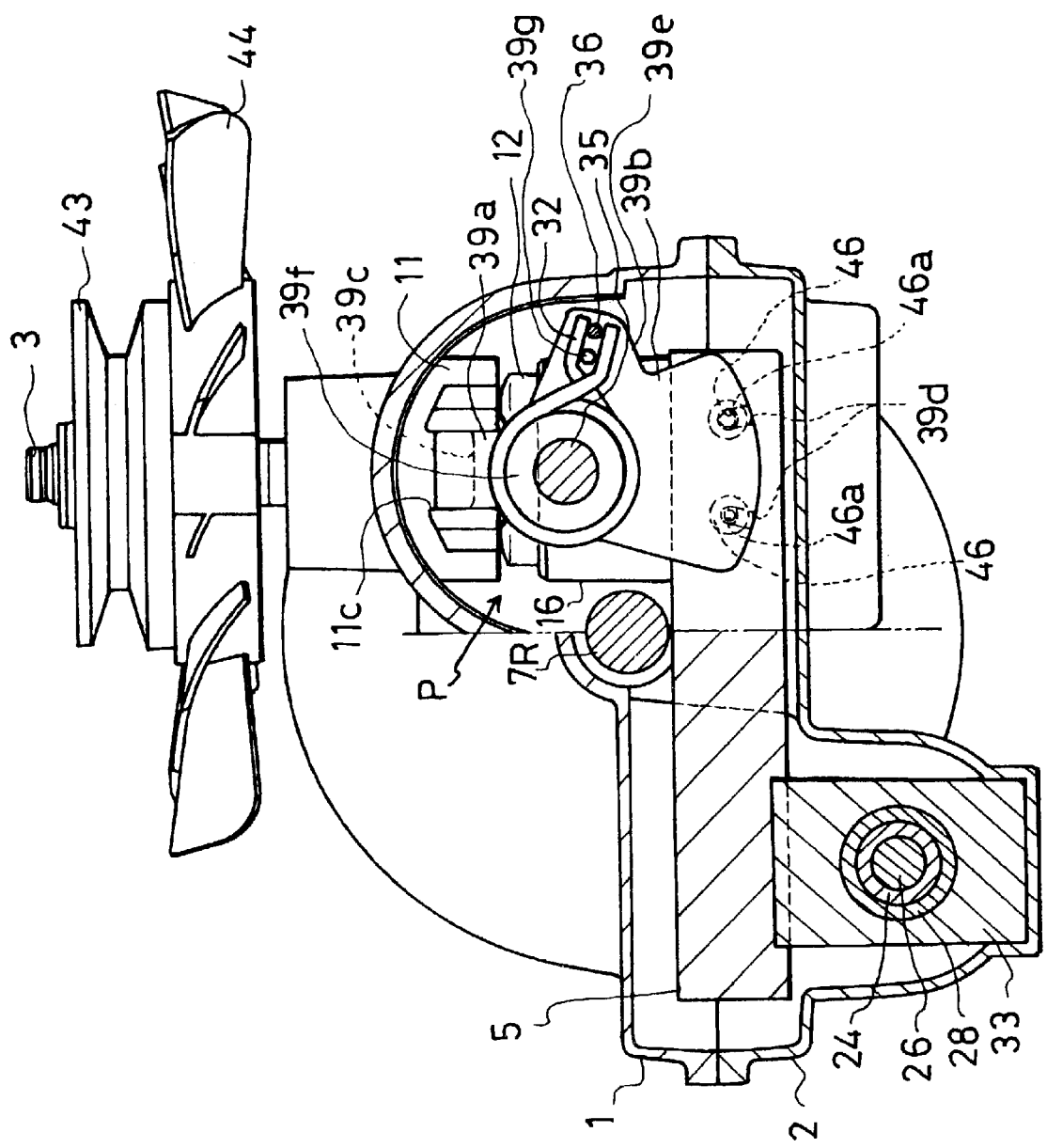
FIG. 8 is a sectional view in the direction of the arrows 8—8 in FIG. 4.
Figure 9:
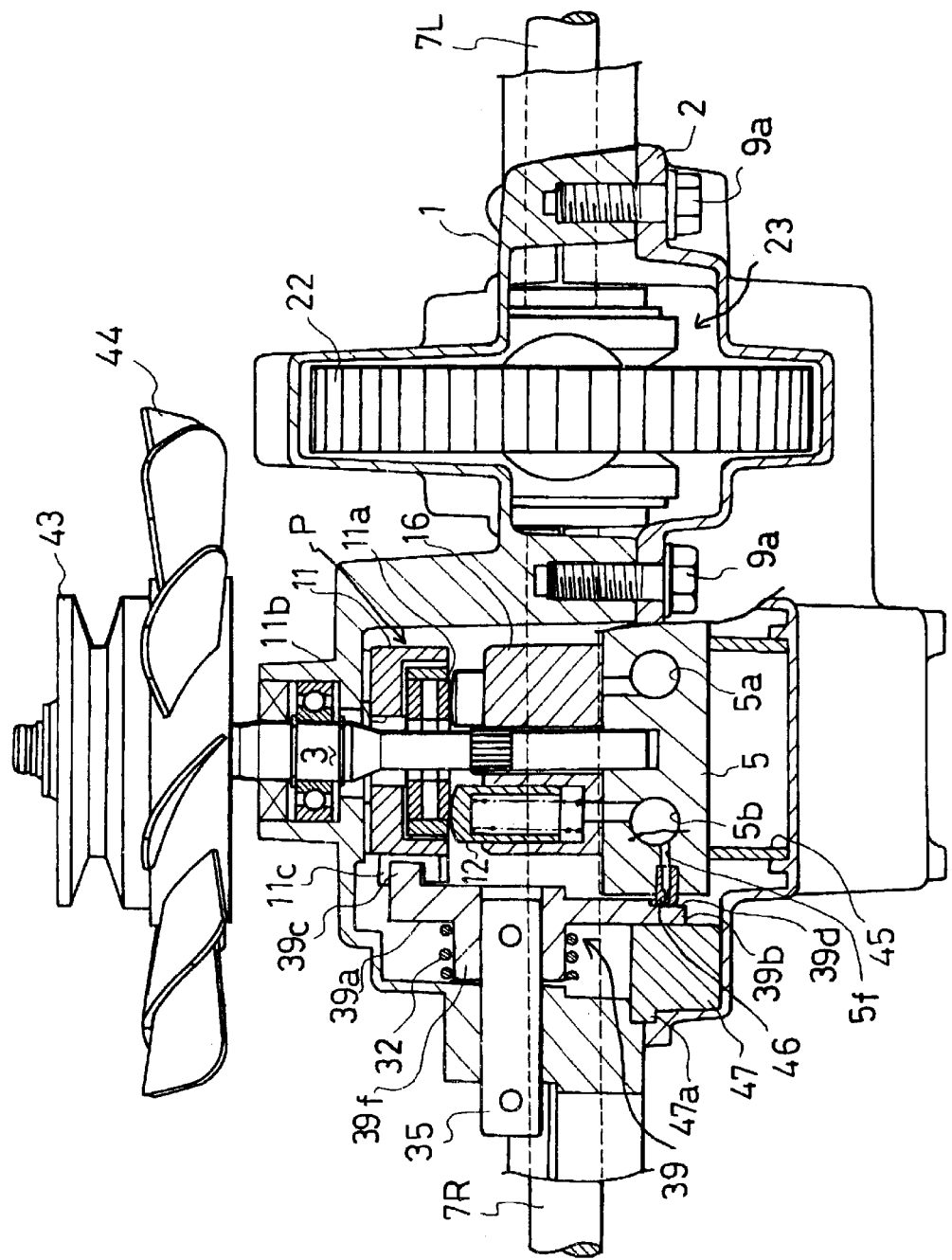
FIG. 9 is a sectional view in the direction of the arrows 9—9 in FIG. 4.

The movable swash plate 11 is angularly adjustable with respect to the axis of rotation of cylinder block 16 to vary the discharge amount and the discharge direction of oil from hydraulic pump P. As shown in FIGS. 8 and 9, movable swash plate 11 has a convex surface that cooperates with a concave surface of upper half housing 1. Movable swash plate 11 is a cradle type swash plate which is slidably guided along the concave surface of swash plate 11.

Figure 6:
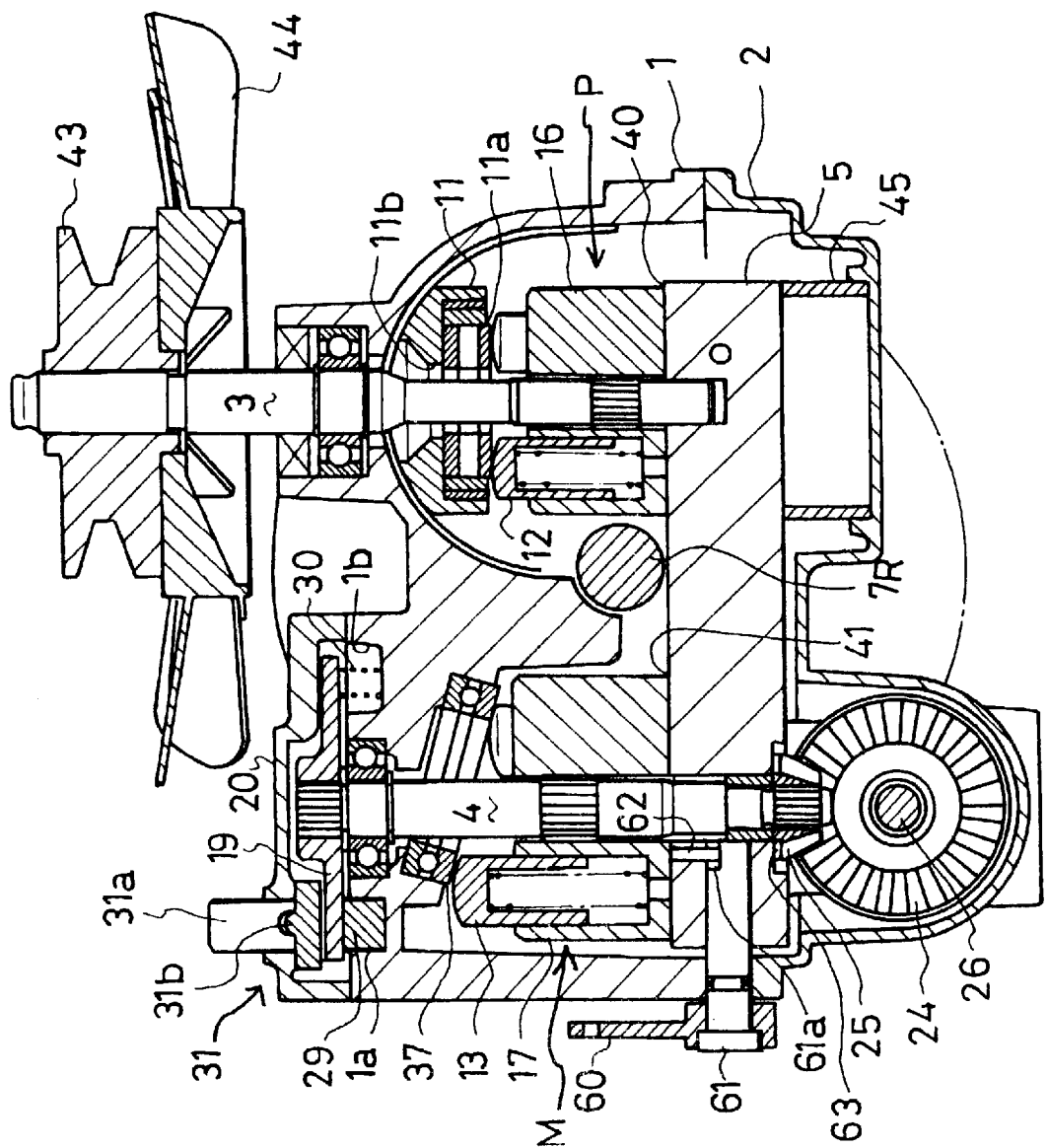
FIG. 6 is a sectional view in the direction of the arrows 6—6 in FIG. 4.
Figure 7:
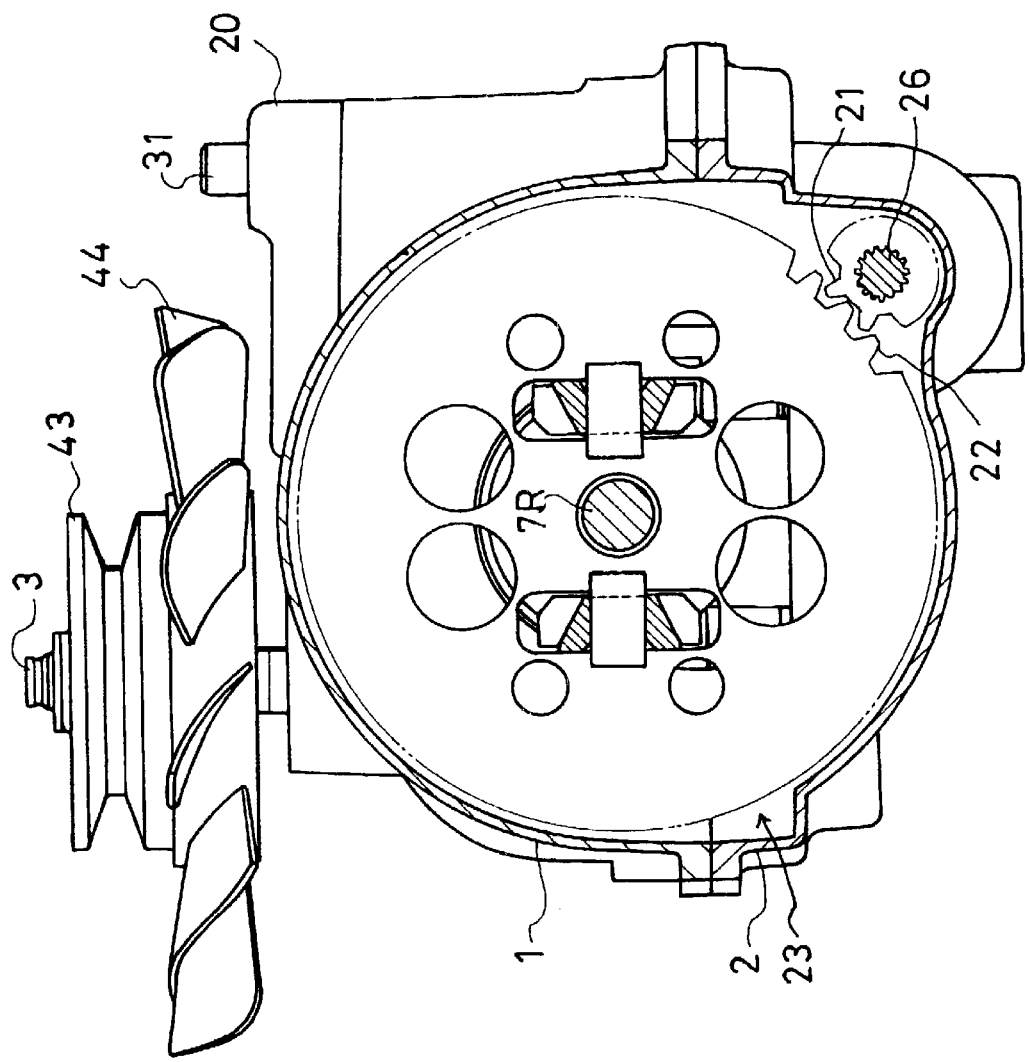
FIG. 7 is a sectional view in the direction of the arrows 7—7 in FIG. 4.
Figure 10:
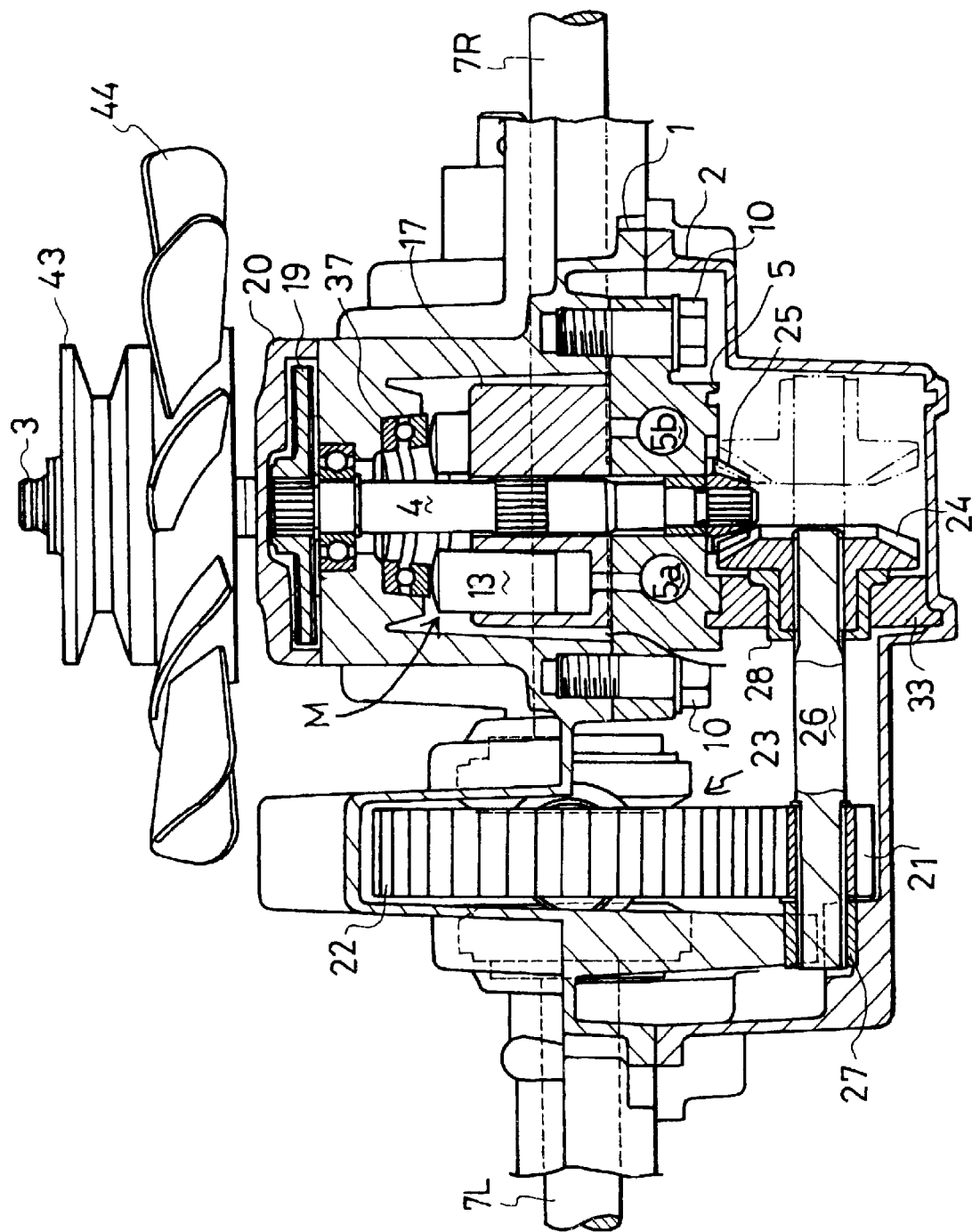
FIG. 10 is a sectional view in the direction of the arrows 10—10 in FIG. 4.

Hydraulic pump P is fluidly connected to hydraulic motor M through passageways located in center section 5 to form a closed hydraulic circuit. As shown in FIGS. 6 and 10, a cylinder block 17 of hydraulic motor M is rotatably disposed upon motor mounting surface 41 of center section 5. A plurality of cylinder bores of cylinder block 17 reciprocally receive a plurality of pistons 13. Heads of pistons 13 abut a swash plate 37 immovably affixed to an inner surface of upper half housing 1. Motor shaft 4 is coaxial with and rotatably affixed to cylinder block 17 thereby providing a fixed displacement hydraulic motor M.

Figure 5:
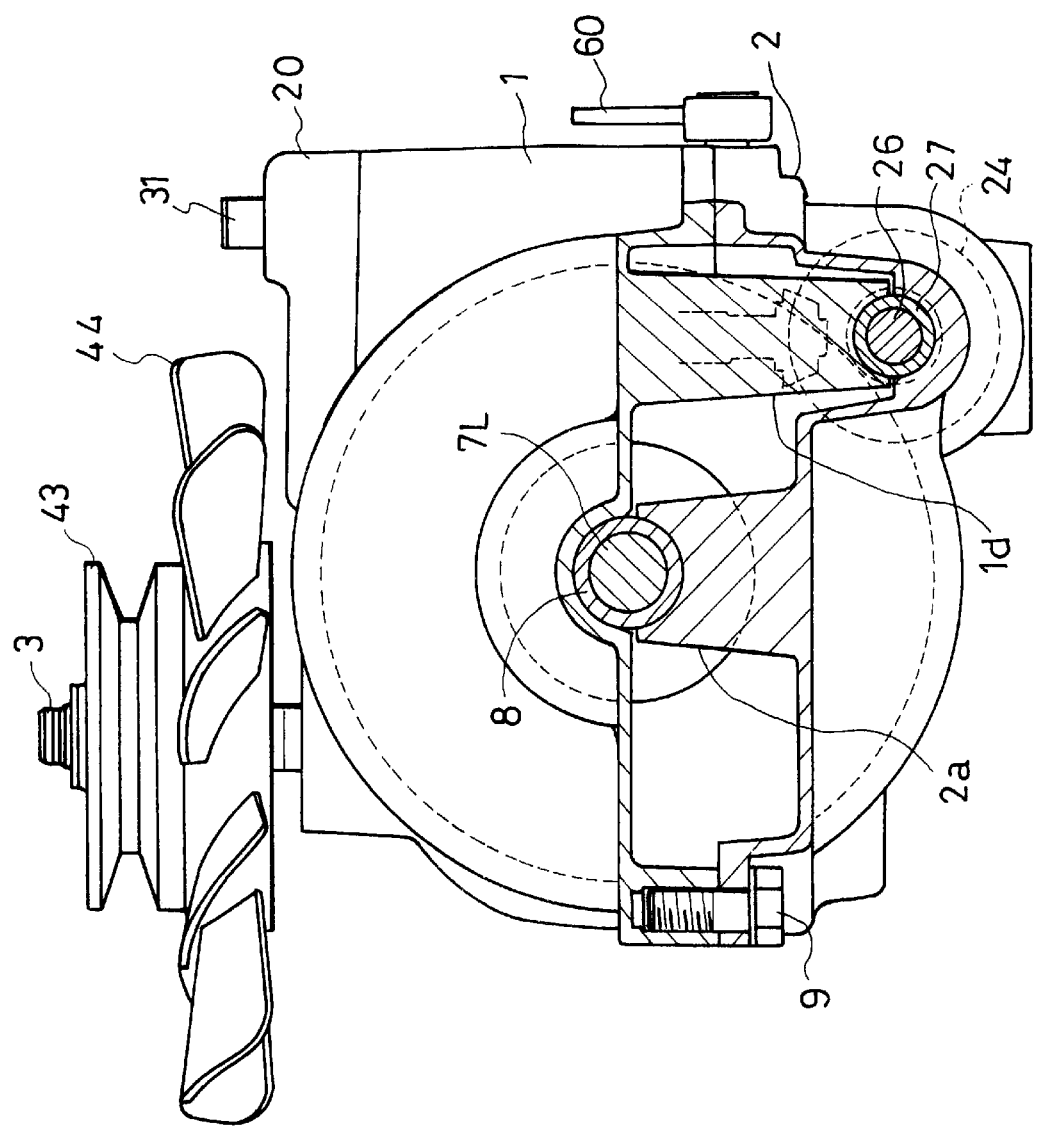
FIG. 5 is a sectional view in the direction of the arrows 5—5 in FIG. 4.

A transmission gear train is disposed adjacent a lower surface of center section 5 and transmits power from motor shaft 4 to a transmission ring gear 22 of a differential 23. As shown in FIGS. 6 and 10, motor shaft 4 extends through center section 5. An output bevel gear 25 is connected to a lower end of motor shaft 4. A thrust plate 63 is interposed between output gear 25 and the lower surface of center section 5 to receive the thrust of output gear 25. As shown in FIGS. 5 and 10, a counter shaft 26 extends parallel to axles 7L and 7R. A first end of counter shaft 26 is rotatably supported by a bushing 27 disposed between a downwardly extending leg 1d of upper half housing 1 and an inner surface of lower half housing 2. A second end of counter shaft 26 is rotatably supported by a bushing 28. Bushing 28 is disposed between a support plate 33 that is mounted between an inner surface of lower half housing 2 and the lower surface of center section 5. Output gear 25 of motor shaft 4 engages a bevel gear 24 mounted on counter shaft 26. Optionally, as shown in phantom in FIG. 10, counter shaft 26 may extend rightwardly beyond the rotational axis of motor shaft 4 whereby bevel gear 24 engages output gear 25 in such a manner to reverse the rotational direction of the gear train. When the axle driving apparatus is disposed at one end of the vehicle body, the position of bevel gear 25 may be simply modified, thereby easily changing the rotational direction output power.

Figure 14:
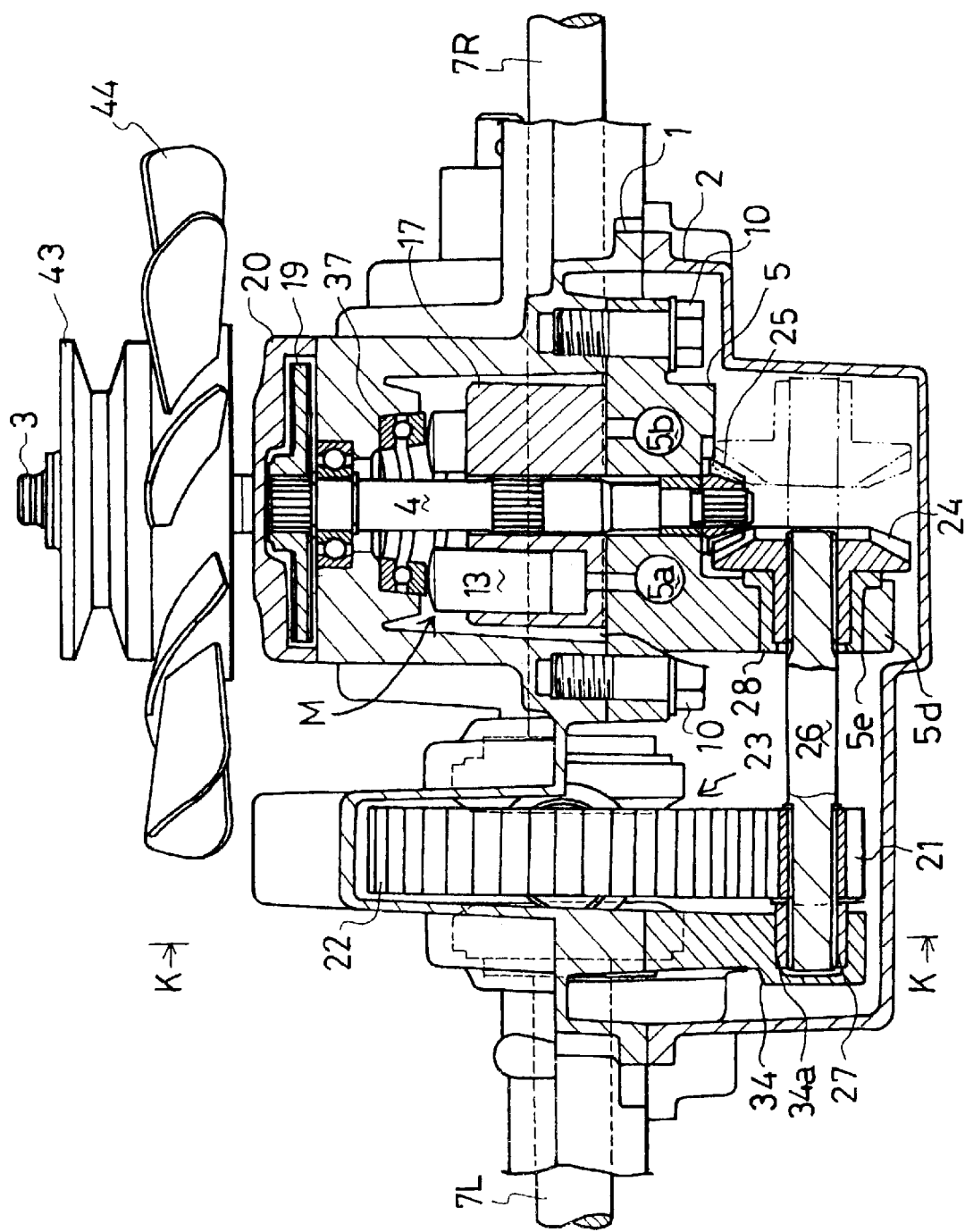
FIG. 14 is a sectional rear view of a support structure for a counter shaft in a modified embodiment of the invention.
Figure 15:
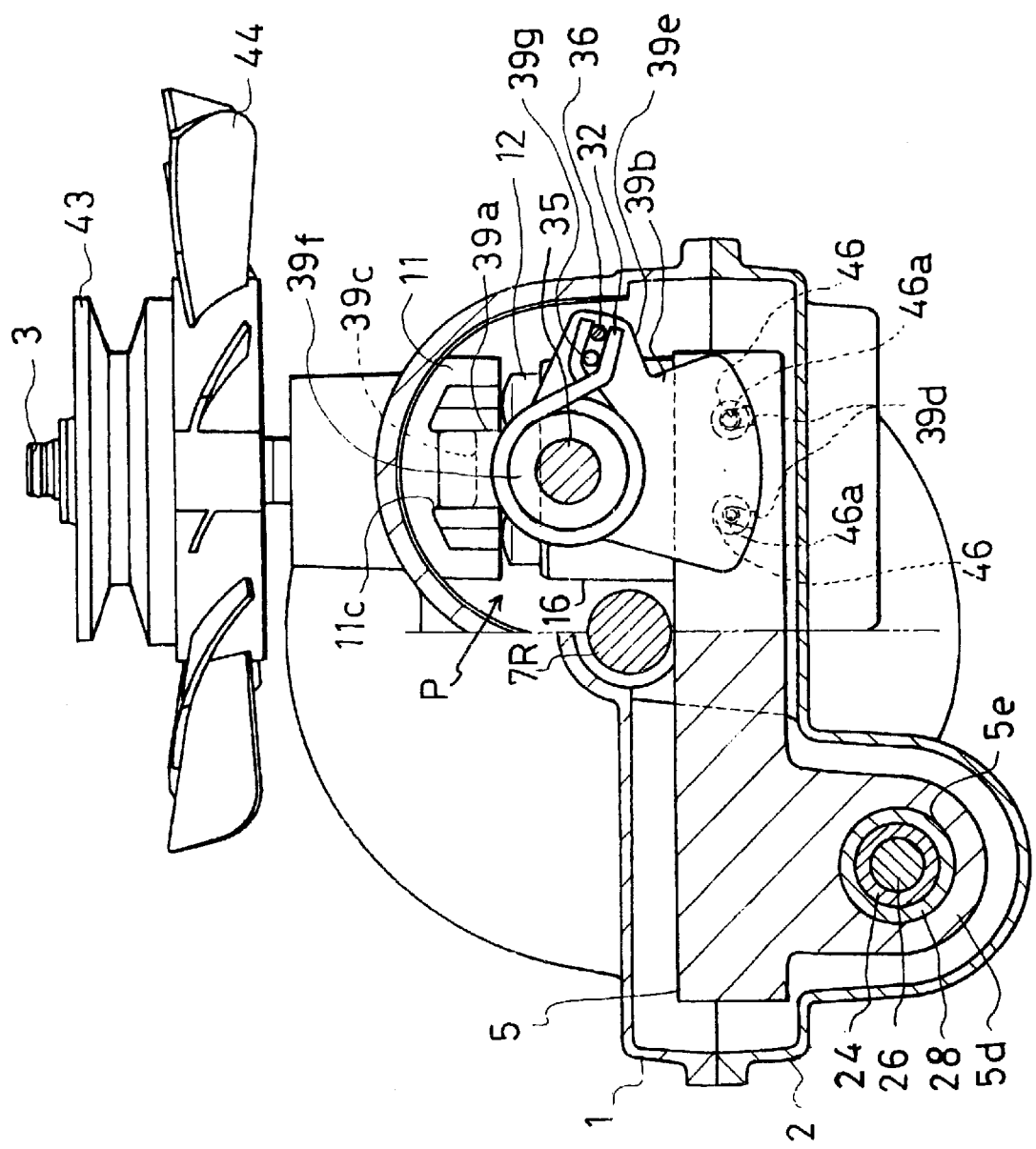
FIG. 15 is a sectional view of a bearing on a center section for a counter shaft.
Figure 16:
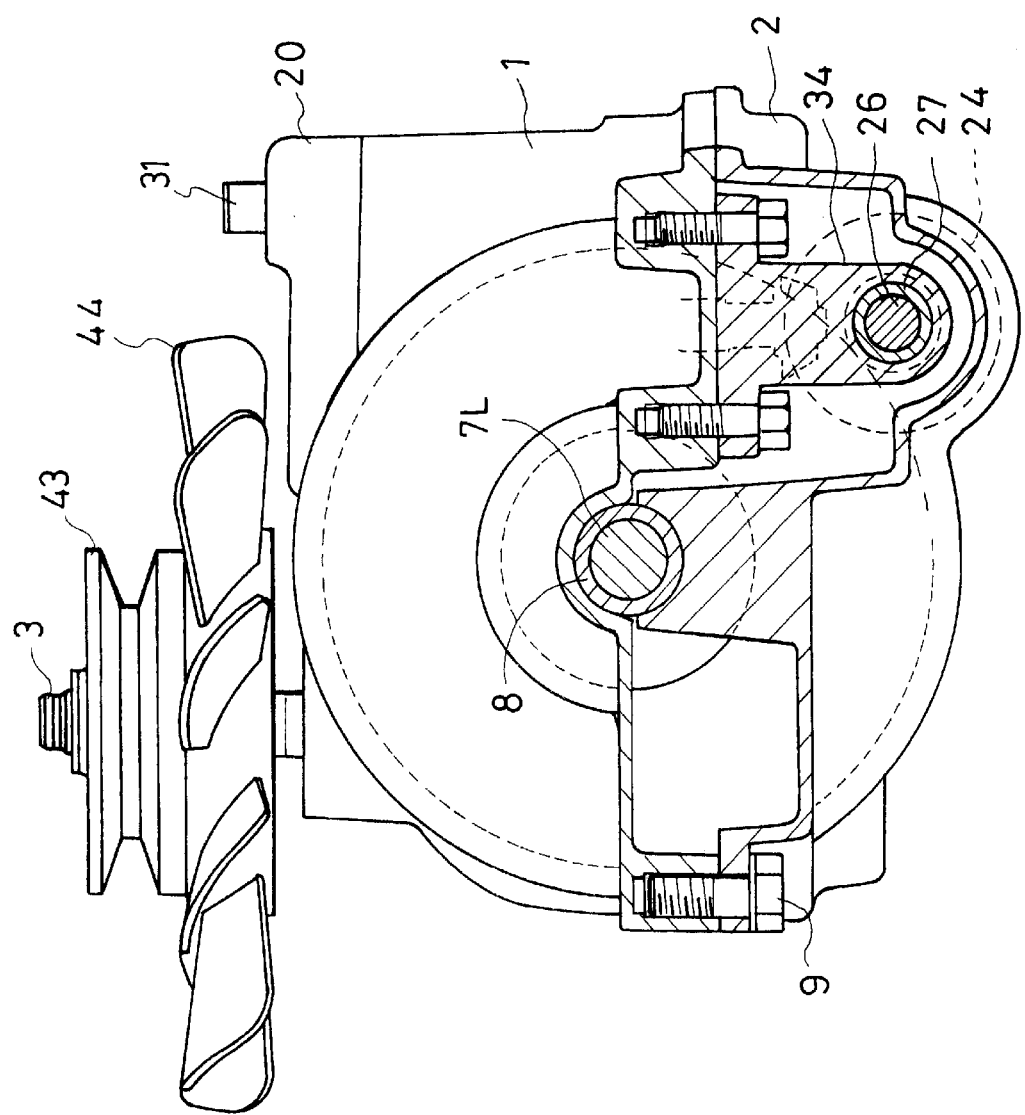
FIG. 16 is a sectional view in the direction of the arrows 16—16 in FIG. 14.

Alternatively, counter shaft 26 may be supported by bearings 5d and 34, respectively provided on center section 5 and upper half housing 1, as shown in FIGS. 14 and 15. Bearing 5d is integral with and projects downwardly from the lower surface of center section 5. A bore 5e is located in a lower portion of bearing 5d. The second end of counter shaft 26 is rotatably supported by bushing 28 located in bore 5e. As shown in FIGS. 14 and 16, a leg shaped bearing 34 is laterally positioned adjacent to a left side of ring gear 22 and is fixed to an inner surface of upper half housing 1 by bolts or the like. Lateral support bore 34a is located on a lower portion of bearing 34 and rotatably supports the first end of counter shaft 26 via bushing 27. One skilled in the art would recognize that bearing 5d may also be formed separable from center section 5 in the same manner as bearing 34 and affixed to a lower surface of center section 5 by bolts or the like.

A small diameter gear 21 is rotatably affixed upon counter shaft 26 and is coaxially aligned with bevel gear 24. The small diameter gear engages ring gear 22 of differential 23 to drive left and right side axles 7L and 7R.

A brake disc 19 is provided adjacent an upper end of motor shaft 4 which extends though an upper portion of upper half housing 1. As shown in FIGS. 6, 10 and 14, cover 20 houses brake disc 19 and is disposed on the upper portion of upper half housing 1. As shown in FIG. 6, recesses 1a and 1*b* are provided on an outer surface of upper half housing 1 and are positioned under brake disc 19. Recess 1*a* receives a brake pad 29 and recess 1*b* receives a spring 30. Spring 30 upwardly biases brake disc 19 away from brake pad 29.

Brake cover 20 supports a biasing member 31 above brake pad 29 whereby biasing member 31 and brake pad 29 sandwich brake disc 19. A brake shaft 31*a* projects from an outer portion of biasing member 31 and extends outwardly from the brake cover 20. An external brake arm (not shown) is fixed to brake shaft 31*a* in a conventional manner. A projection 31*b* is provided on an upper surface of biasing member 31 and engages a shallow cam groove located on an inner surface of brake cover 20. Rotation of the brake arm (not shown) rotates projection 31*b* from the cam groove thereby biasing brake disc 19 against brake pad 29 to brake motor shaft 4.

Center section 5, as shown in FIGS. 4, 6, 9 and 10, has an elongated plate-like shape. Pump mounting surface 40 and motor mounting surface 41 each include a pair of arcuate ports. Linear oil passages 5*a* and 5*b* are bored in parallel through center section 5 thereby fluidly connecting respective arcuate ports of both the pump mounting surface 40 and motor mounting surface 41 and providing a closed hydraulic circuit to circulate the operating oil between hydraulic pump P and hydraulic motor M.

Oil in the oil sump of the housing is supplied to the arcuate ports on pump mounting surface 40 via check valves (not shown) disposed on the lower surface of center section 5. An annular oil filter 45 filters the oil provided to the check valves and is interposed between center section 5 and lower half housing 2.

Also shown in FIGS. 8 and 9, bored oil passages 5*f* extend from each of oil passages 5*a* and 5*b*, respectively. Piston members 46 are slidably received within opening ends of oil passages 5*f*, as discussed below. Each piston member 46 includes an axial orifice 46*a*.

A control shaft 35, as shown in FIG. 9, is journalled on a left side wall of upper half housing 1 and extends parallel to axle 7L. The control shaft 35 provides means for adjusting the inclination of movable swash plate 11. Control shaft 35 is connected to a vehicle speed change lever (not shown) equipped on the vehicle in a conventional manner. A control arm 39 is connected to an inner end of control shaft 35, as shown in FIG. 8, and comprises an upwardly extending first arm 39*a*, an sector abutting plate 39*b* and a forwardly extending second arm 39*e*. Although abutting plate 39*b* is separable from control arm 39, it is rotatably affixed to control arm 39. An engaging portion 39*c* projects from an upper end of first arm 39*a*. Engaging portion 39*c* engages a groove 11*c* provided on a side surface of movable swash plate 11. Rotation of control arm 39 controls the inclination of movable swash plate 11, in response to varying the position of the speed change lever (not shown), thereby varying the output of hydraulic pump P.

A neutral return coil spring 32 is provided on a boss 39*f* of control arm 39. An eccentric shaft 36 is mounted on an inside wall of upper half housing 1 adjacent control shaft 35. An engaging portion 39*g* projects from second arm 39*e* of control arm 39. The ends of neutral return spring 32 extend toward second arm 39*a* and engage eccentric shaft 36 and engaging portion 39*g*.

As an operating force on the vehicle speed change lever rotates control arm 39, engaging portion 39*g* moves away from eccentric shaft 36. The ends of neutral return spring 32 thereby contact engaging portion 39*g* and eccentric shaft 36 to provide a biasing force on control arm 39. Once the operating force is released, neutral return spring 32 biases engaging portion 39*g* to its neutral position adjacent eccentric shaft 36.

Eccentric shaft 36 is bolted to upper half housing 1. The position of eccentric shaft 36 may be adjusted by loosening the bolt and rotatably shifting the eccentric shaft 36. This adjustment allows accurate adjustment of the neutral position of engaging portion 39*g* whereby the neutral positions of control arm 39 and movable swash plate 11 may be adjusted.

Abutting plate 39*b* extends along the side surface of center section 5 within lower half housing 2 such that abutting plate 39*b* abuts against piston members 46 through its whole range of motion. Grooves 39*d* are provided on abutting plate 39*b* and extend toward center section 5. The width of grooves 39*d* is larger than the diameter of each orifice 46*a*. The grooves 39*d* align with respective orifices 46*a* when control arm 39 is in its neutral position. Pressure oil in the closed circuit is released into the oil sump of the housing when grooves 39*d* and orifices 46*a* are aligned.

Moving control arm 39 from its neutral position to control the angle of movable swash plate 11 causes orifices to contact a flat side surface of control arm 39 thereby stopping fluid communication between orifices 46*a* and grooves 39*d*. As shown in FIG. 9, abutting plate 39*b* is disposed between piston members 46 and a receiving block 47. Receiving block 47 is held in place between upper half housing 1 and lower half housing 2 by a projection 47*a* that extends parallel to the housing joint surfaces. As discussed below, rotational resistance is applied to abutting plate 39*b* by the cooperation of piston members 46 and receiving block 47 as oil pressure increases within piston members 46.

As the vehicle speed change lever is operated to rotate control shaft 35, engaging portion 39*c* tilts movable swash plate 11 and varies the discharge amount of operating oil of hydraulic pump P. In turn, the rotational speed of motor shaft 4 of hydraulic motor M is controlled thereby providing a step-less speed change transmission to axles 7L and 7R. When the vehicle speed change lever is returned to its neutral position, the one oil passage, 5*a* or 5*b*, corresponding to a high pressure side of hydraulic pump P is subjected to a pressure proportional to the load on axles 7L and 7K. The one corresponding piston member 46 is biased against abutting plate 39*b* thereby providing a braking force upon abutting plate 39*b*, control arm 39 and control shaft 35. The braking force prevents abrupt dynamic braking and sudden stops. As control arm 39 nears its neutral position, orifices 46*a* communicate with grooves 39*d* respectively and release the residual pressure within the closed circuit. Braking force on control arm 39 is thereby released to prevent shock and increase the range of the neutral position.

The present invention also includes a by-pass operating lever 60 for opening oil passages 5*a* and 5*b* to the oil sump. As shown in FIG. 6, by-pass operating lever 60 includes a by-pass shaft 61 projecting outwardly from the housing. By-pass operating lever 60 is located adjacent the housing joint surfaces between upper half housing 1 and lower half housing 2. An inner end of by-pass shaft 61 extends through a thick portion of center section 5 and is adjacent a lower bearing of motor shaft 4. A flat surface 61*a* is provided on the inner end of by-pass shaft 61. A push pin 62 slidably extends through a vertical through-bore in the center section 5. The through-bore is parallel to the axis of rotation of cylinder block 17. The vertical through-bore is located between the pair of arcuate ports of the motor mounting surface 41 such that one end of push pin 62 is frictionally engageable with cylinder block 17 and the other end of push pin 62 abuts flat surface 61a.

When the vehicle is hauled or towed, by-pass shaft 61 is rotated and flat surface 61a biases push pin 62 toward cylinder block 17 thereby raising cylinder block 17 from motor mounting surface 41. As cylinder block 17 moves away from motor mounting surface 41, oil passages 5a and 5b communicate with the oil sump through the arcuate ports on mounting surface 41 thereby by-passing the hydraulic circuit and enabling motor shaft 4 to be freely rotated.

Figure 4:
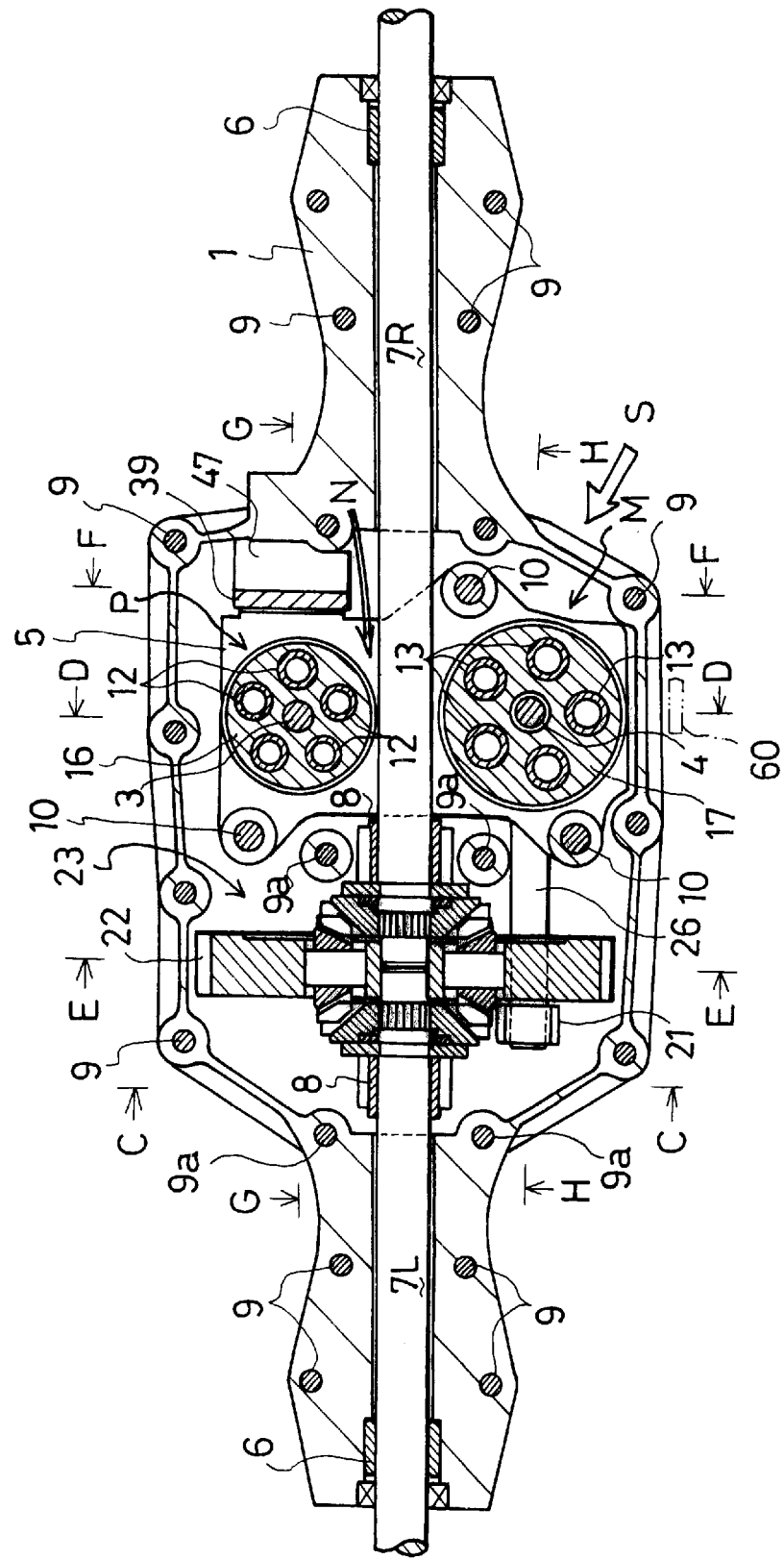
FIG. 4 is a sectional view in the direction of the arrows 4—4 in FIG. 3.

Upper half housing 1 and the lower half housing 2 include peripheral flanges that abut against each other. As shown in FIG. 4, the flanges are bolted together with bolts 9. The present invention further provides supplemental support flanges for increased support of differential 23. The supplemental support flanges are disposed immediately adjacent differential 23 and are tightened together by supplemental bolts 9a, as shown in FIGS. 4 and 9.

Hydraulic pump P and hydraulic motor M of the axle driving apparatus shown in FIGS. 1–10 are disposed forwardly and rearwardly of right side axle 7R, respectively. Center section 5 is disposed beneath right side axle 7R. An imaginary plane, extending through the axes of rotation of hydraulic pump P and hydraulic motor M, extends vertically and perpendicularly to axles 7L and 7R. Differential 23 is transversely offset from the center of the housing. Also, differential 23 is disposed at one side of the center section 5. Hydraulic pump P and hydraulic motor M are longitudinally contained within the diameter of ring gear 22 thereby providing a compact configuration of the axle driving apparatus. Also shown in FIGS. 6, 9 and 10, hydraulic pump P and hydraulic motor M are vertically contained within the diameter of ring gear 22 further compacting the axle driving apparatus.

Figure 11:
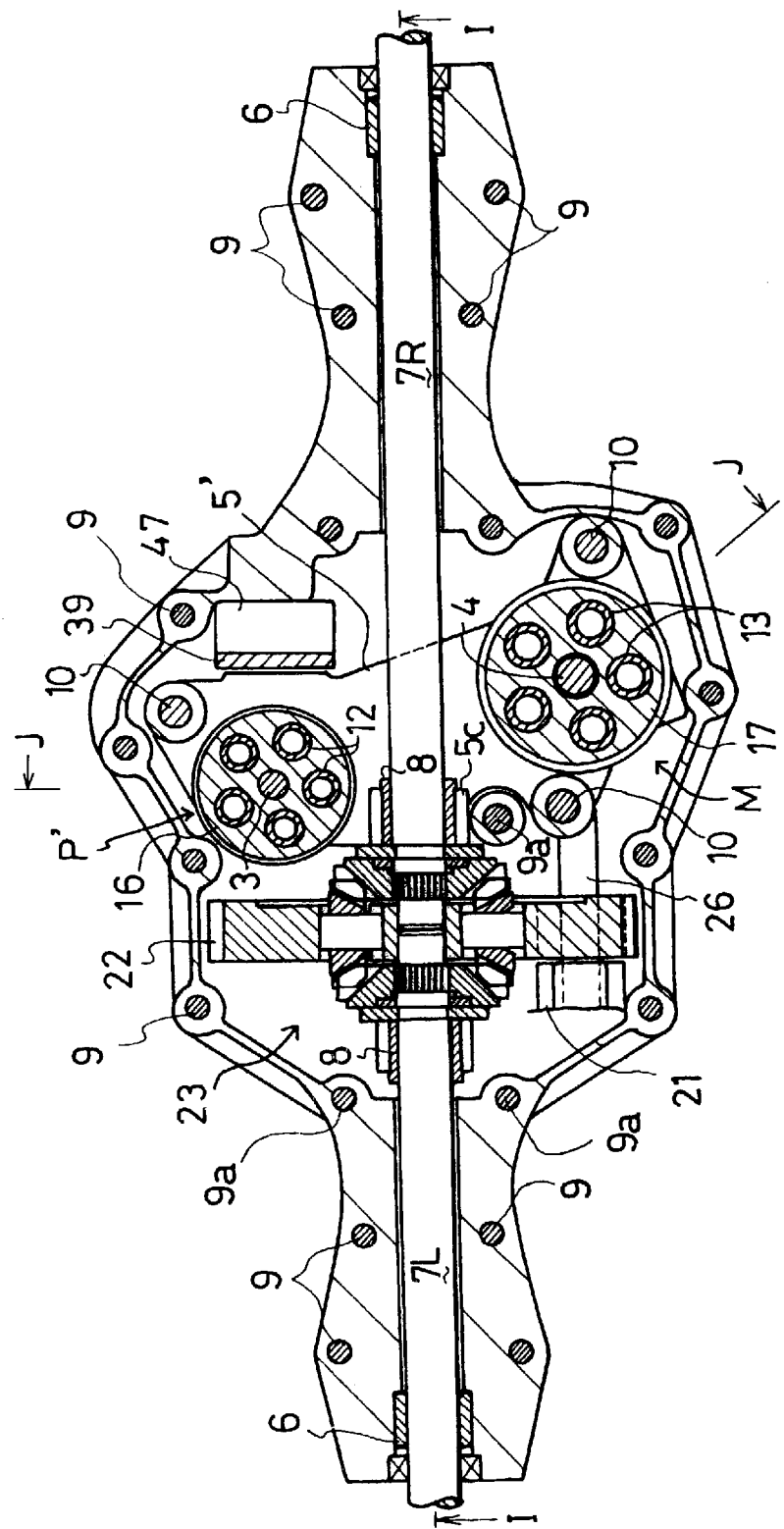
FIG. 11 is a sectional plan view of a modified embodiment of the invention, showing an arrangement of a hydraulic pump.
Figure 12:
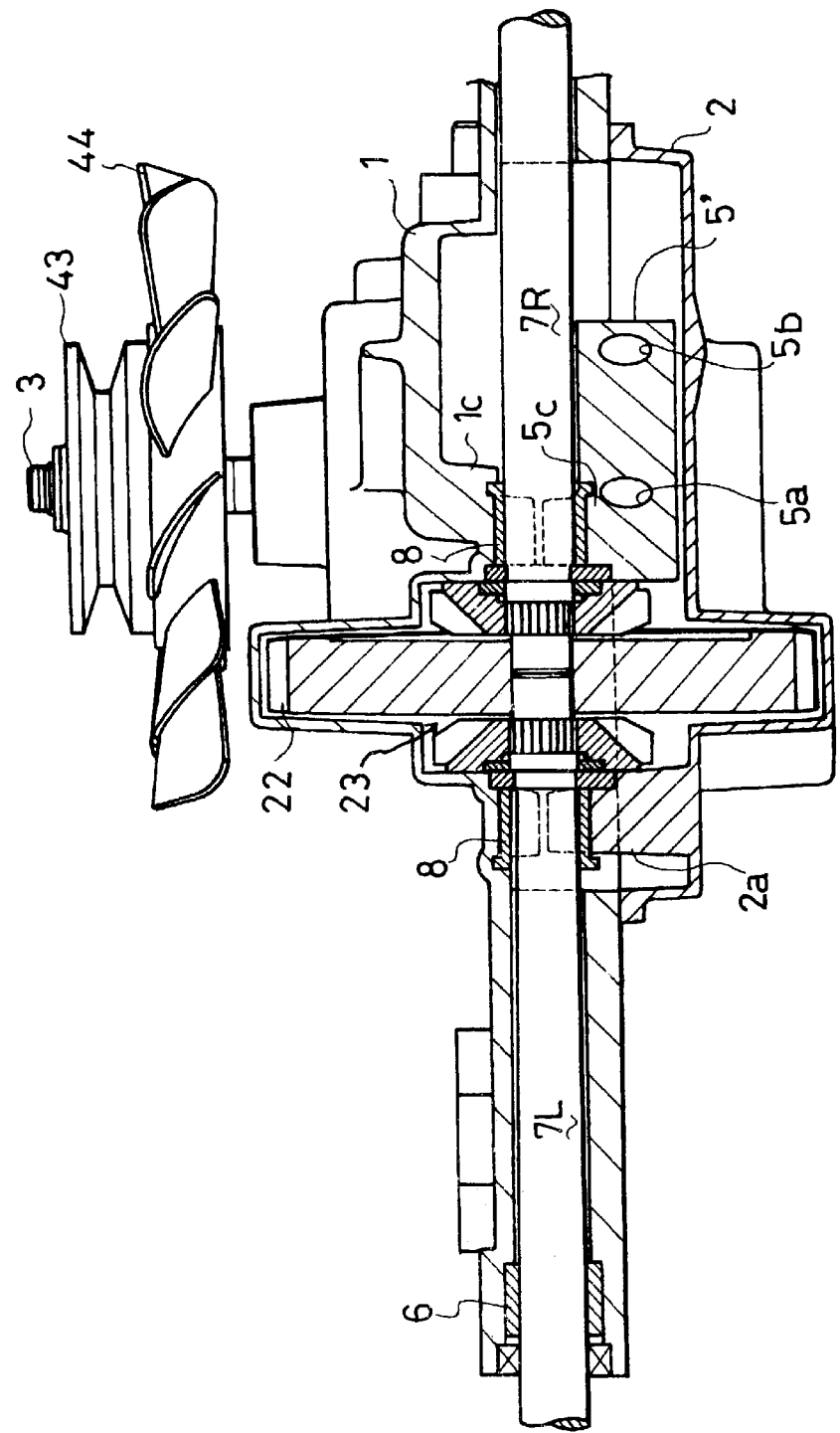
FIG. 12 is a sectional view in the direction of the arrows 12—12 in FIG. 11.
Figure 13:
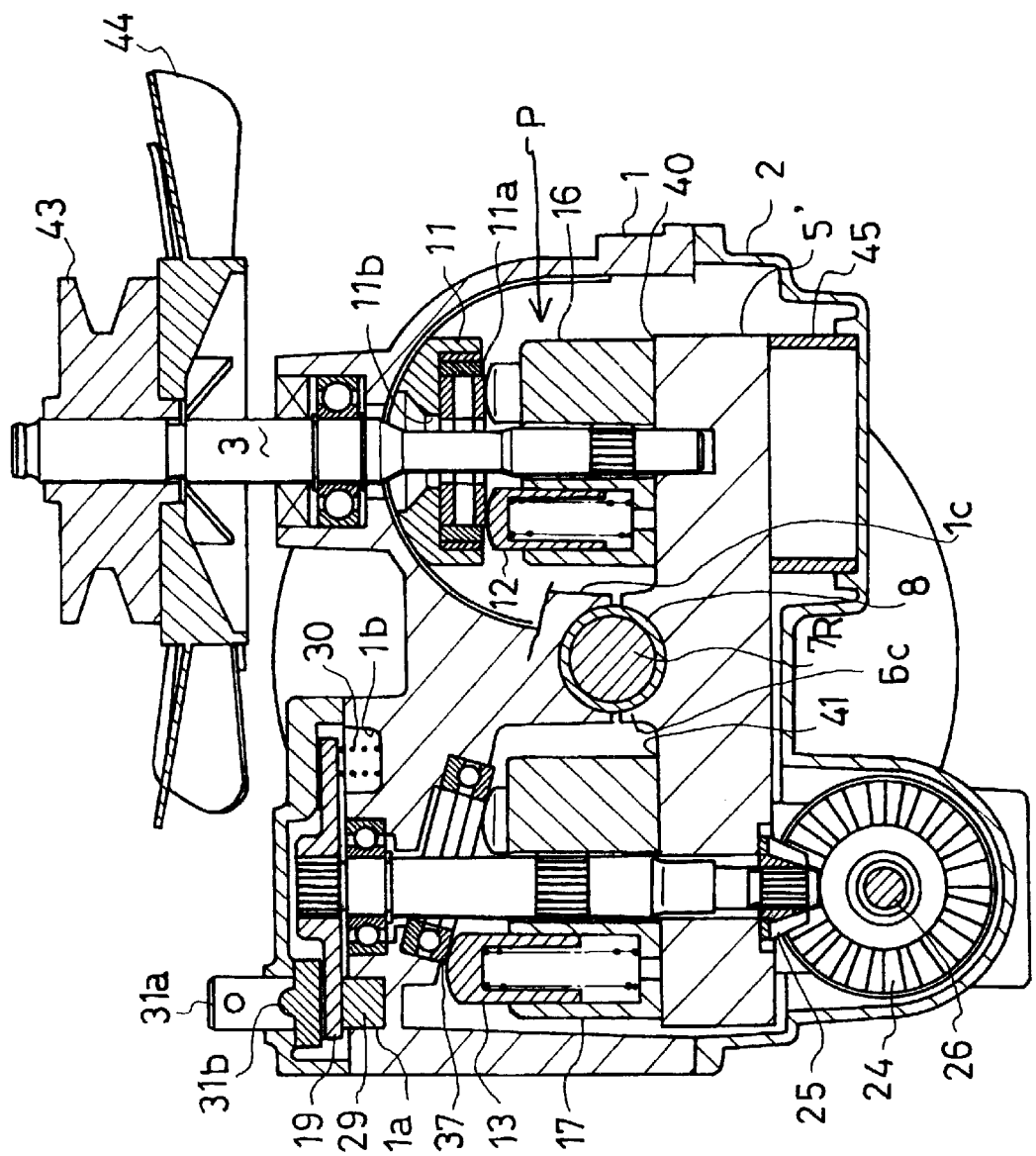
FIG. 13 is a sectional view in the direction of the arrows 13—13 in FIG. 11.

Another embodiment of the invention, as shown in FIGS. 11–13, includes right side axle 7R extending between hydraulic pump P and hydraulic motor M in the same manner as in the above embodiment. However, hydraulic pump P and hydraulic motor M are also transversely offset from one another.

The power transmission between hydraulic pump P, hydraulic motor M, motor shaft 4 and differential 23 is similar to the above embodiment. Right side axle 7R also extends between longitudinally disposed hydraulic pump P and hydraulic motor M in the same manner as in the above embodiment.

However, as shown in FIG. 11, hydraulic pump P of this embodiment is disposed in front of axle 7R on a front portion of center section 5' and immediately adjacent to ring gear 22. Only one bolt 9a is necessary to tighten the HST and differential 23 together because hydraulic pump P is disposed immediately adjacent to ring gear 22. Such configuration of the HST and the gear train reduces the number of bolts used for assembly.

Right side axle 7R, of the embodiment shown in FIG. 3, is supported between hydraulic pump P and hydraulic motor M by two feet, each provided on upper half housing 1 and lower half housing 2, respectively. However, in the embodiment shown in FIGS. 11 and 12, right side axle 7R is supported to one side of differential 23 by bearing projections 1c and 5c. Bearing projection 1c projects downwardly from an inner surface of upper half housing 1, while bearing projection 5c projects upwardly from an inner surface of center section 5'.

Enclosing the axles and the HST for driving the axles within the housing in the manner of the present invention, provides a compact axle driving apparatus. In particular, locating the hydraulic pump and the hydraulic motor longitudinally of one another on either side of the axle and within the diameter of the differential ring gear provides a compact axle driving apparatus which minimizes unused space and improves the longitudinal weight distribution of the vehicle.

A center section supporting the hydraulic pump and the hydraulic motor in the disclosed manner of the present invention provides a closed, hydraulic circuit, step-less transmission having a simplified design which may be fully enclosed within the housing.

Mounting the hydraulic pump and motor on a first surface of the center section and on opposing longitudinal sides of the axle provides a compact design minimizing unused space. Mounting the hydraulic pump on the surface of the center section that is immediately adjacent to the differential, further minimizes unused space of the axle driving apparatus.

Weight distribution of the axle driving apparatus is also enhanced by disposing the center section immediately adjacent to the axles in the manner of the present invention. Particularly, disposing the gear train adjacent to a second surface of the center section opposite the axle, and disposing the hydraulic pump and motor on the first surface of the center section that is adjacent the axle, allows the gear train to utilize otherwise unused space, thereby further compacting the axle driving apparatus and further enhancing weight distribution.

The housing design of the present invention, including at least two half housings that can be separated at respective housing joint surfaces that extend parallel to the axles, provides a means to easily assemble and disassemble the housing. Supporting the inner bearings on the half housings adjacent the differential provides a stiffer, more rigid support for the differential. Disposing the assembly bolts of the half housings immediately adjacent to the differential also provides better support of the differential thereby stabilizing the axles with respect to the housing.

Although the invention has been described with reference to several different embodiments, these embodiments are merely exemplary and are not intended to limit the scope of the present invention which is defined solely by the appended claims.

What is claimed is:

1. An axle driving apparatus comprising:
 a housing;
 an axle housed in said housing; and
 a hydrostatic transmission housed in said housing for driving said axle, wherein said hydrostatic transmission includes a hydraulic pump and a hydraulic motor fluidly interconnected with each other, and wherein said hydraulic pump and said hydraulic motor are disposed on opposite sides of said axle.

2. An axle driving apparatus according to claim 1, wherein the axis of rotation of said hydraulic pump is substantially perpendicular to said axle.

3. An axle driving apparatus according to claim 1, wherein the axis of rotation of said hydraulic motor is substantially perpendicular to said axle.

4. An axle driving apparatus according to claim 1, wherein the axis of rotation of said hydraulic pump and the axis of rotation of said hydraulic motor are substantially perpendicular to said axle.

5. An axle driving apparatus comprising;
 a housing;

an axle housed in said housing;
a hydrostatic transmission housed in said housing for driving said axle, wherein said hydrostatic transmission includes a hydraulic pump and a hydraulic motor fluidly interconnected with each other, and said hydraulic pump and said hydraulic motor are disposed on opposite sides of said axle; and
a pair of substantially horizontal mounting surfaces housed in said housing for supporting said hydraulic pump and said hydraulic motor, wherein the axis of rotation of said hydraulic pump and the axis of rotation of said hydraulic motor are substantially perpendicular to said axle.

6. An axle driving apparatus according to claim 5, further comprising a center section separably mounted within said housing, wherein said pair of mounting surfaces are formed on said center section.

7. An axle driving apparatus comprising:
a housing;
an axle housed in said housing;
a hydrostatic transmission housed within said housing for driving said axle, wherein said hydrostatic transmission includes a hydraulic pump and a hydraulic motor fluidly interconnected with each other;
a center section separably mounted in said housing and fluidly interconnecting said hydraulic pump and said hydraulic motor; and
a pair of substantially horizontal mounting surfaces provided on a first side of said center section, wherein said mounting surfaces include a pump mounting surface and a motor mounting surface for mounting said hydraulic pump and said hydraulic motor, respectively;
wherein said pump mounting surface and said motor mounting surface are disposed on opposite sides of said axle, and the axis of rotation of said hydraulic pump and the axis of rotation of said hydraulic motor are substantially perpendicular to said axle.

8. An axle driving apparatus according to claim 7, wherein said axle is disposed transversely above said first side.

9. An axle driving apparatus according to claim 7, wherein the axis of rotation of said hydraulic pump and the axis of rotation of said hydraulic motor lie in a common plane which is substantially perpendicular to the longitudinal axis of said axle.

10. An axle driving apparatus according to claim 7, further comprising:
a transmission gear disposed on said axle, wherein the rotational axis of said hydraulic pump mounted on said pump mounting surface of said center section is disposed closer to said transmission gear than the rotational axis of said hydraulic motor mounted on said motor mounting surface.

11. An axle driving apparatus comprising:
a pair of left and right axles;
a differential for differentially coupling said pair of left and right axles;
a housing enclosing said pair of axles and said differential, wherein said housing includes at least two separable housings, each of said housings having a housing joint surface that extends parallel to said pair of axles;
a bearing formed by said housings when said housings are assembled, wherein at least an inner end of each of said pair of axles is supported by said bearing; and
a bolt for joining said housings, said bolt being disposed adjacent to said bearing.

12. An axle driving apparatus comprising:
a housing;
an axle housed in said housing;
a transmission gear train housed in a center portion of said housing and drivingly coupled with said axle, wherein said axle extends transversely and outwardly from said center portion of said housing and parallel to a housing joint surface of said housing, and wherein said transmission gear train is offset from a first side of said axle;
a space formed on a second side of said axle within said housing opposite to said first side; and
a hydrostatic transmission disposed in said space for driving said axle.

13. An axle driving apparatus according to claim 12, wherein said housing includes at least two housings, wherein each said housing has a joint surface extending parallel to said axle.

14. An axle driving apparatus comprising:
a housing;
first and second axles housed in said housing;
a differential housed in said housing for differentially coupling said first and second axles with each other, wherein said first and second axles extend longitudinally outwardly from substantially a center portion of said housing, and wherein said differential is offset in the longitudinal direction to one side of said first and second axles in said housing; and
spaces formed at one side and at another side of said first axle; and
a hydraulic pump and a hydraulic motor for driving said first and second axles, separately disposed in each of said spaces.

15. An axle driving apparatus according to claim 14, wherein said housing is provided with at least two housings separable along a plane substantially in parallel to said first and second axles.

16. An axle driving apparatus according to claim 15, further comprising:
a plate-like center section substantially horizontally fixed to one of said two housings and traversing said first axle; and
a pair of mounting surfaces for mounting thereon said hydraulic pump and said hydraulic motor provided on said center section, wherein the rotational axes of said hydraulic pump and of said hydraulic motor are substantially perpendicular to said first and second axles.

17. An axle driving apparatus according to claim 16, wherein said pair of mounting surfaces are located on a first side of said center section adjacent to said first axle.

18. An axle driving apparatus according to claim 16, further comprising:
a counter shaft disposed at a second side of said center section opposite to said first side and to said hydraulic motor; and
a gear disposed on said counter shaft for operably connecting said hydraulic motor and said differential.

19. An axle driving apparatus according to claim 18, further comprising:
first and second bearings rotatably supporting said counter shaft at one side of said center section; and
a support plate fixedly sandwiched between said center section and one of said two housings, wherein said first bearing surface is provided on said support plate, and said second bearing surface is formed by said housing when said two housings are joined with each other.

20. An axle driving apparatus according to claim 18, further comprising:

first and second bearings for rotatably supporting said counter shaft at one side of said center section, wherein said first bearing is provided on said center section and said second bearing is provided on one of said two housings.

* * * * *